(12) United States Patent
Karhade et al.

(10) Patent No.: US 12,044,888 B2
(45) Date of Patent: Jul. 23, 2024

(54) SILICON GROOVE ARCHITECTURES AND MANUFACTURING PROCESSES FOR PASSIVE ALIGNMENT IN A PHOTONICS DIE

(71) Applicant: Intel Corporation, Santa Clara, CA (US)

(72) Inventors: Omkar Karhade, Chandler, AZ (US); Xiaoqian Li, Chandler, AZ (US); Nitin Deshpande, Chandler, AZ (US); Sujit Sharan, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 687 days.

(21) Appl. No.: 17/131,654

(22) Filed: Dec. 22, 2020

(65) Prior Publication Data

US 2022/0196940 A1 Jun. 23, 2022

(51) Int. Cl.
*G02B 6/42* (2006.01)
(52) U.S. Cl.
CPC ........... *G02B 6/4243* (2013.01); *G02B 6/423* (2013.01); *G02B 6/4239* (2013.01)
(58) Field of Classification Search
CPC .... G02B 6/4243; G02B 6/423; G02B 6/4239; G02B 6/3652; G02B 6/3692; G02B 6/3636; H01L 21/76205
See application file for complete search history.

(56) References Cited

U.S. PATENT DOCUMENTS

| 6,516,448 | B1 | 2/2003 | Vieider | |
| 2004/0120682 | A1* | 6/2004 | Bhagavatula | G02B 6/3636 385/137 |

OTHER PUBLICATIONS

Martin Hoffmann; "Fiber Ribbon alignment Structures Based on Rhombus-Shaped Channels in Silicon", IEEE Photonics Technology Letters, vol. 12, No. 7, Jul. 2000, 3 pages.
Search Report for European Patent Application No. 21198753.2, mailed Mar. 7, 2022, 9 pgs.

* cited by examiner

*Primary Examiner* — John Bedtelyon
(74) *Attorney, Agent, or Firm* — Schwabe, Williamson & Wyatt, P.C.

(57) ABSTRACT

A groove alignment structure comprises an etch stop material and a substrate over the etch stop material. A set of grooves is along a first direction in a top surface of the substrate, and adhesive material is in a bottom of the set of grooves. Optical fibers are in the set of grooves over the adhesive material and a portion of the optical fibers extends above the substrate. A set of polymer guides is along the first direction on the top surface of the substrate interleaved with the set of grooves.

25 Claims, 8 Drawing Sheets

SILICON GROOVE ARCHITECTURES AND MANUFACTURING PROCESSES FOR PASSIVE ALIGNMENT IN A PHOTONICS DIE

TECHNICAL FIELD

Embodiments of the disclosure are in the field of semiconductor packages, and in particular, silicon groove architectures and manufacturing processes for passive alignment in a photonics die.

BACKGROUND

Today's consumer electronics market frequently demands complex functions requiring very intricate circuitry. Scaling to smaller and smaller fundamental building blocks, e.g. transistors, has enabled the incorporation of even more intricate circuitry on a single die with each progressive generation. Semiconductor packages are used to protect an integrated circuit (IC) chip or die, and provide the die with an electrical interface to external circuitry. With the increasing demand for smaller electronic devices, semiconductor packages are designed to be even more compact and must support larger circuit density.

For example, a trend in semiconductor packages is to move optical interconnects into the package to interface directly with a logic chip for increased data transfer speeds transmitting using light. An optical interconnect may include a photonic die connected to a processor or memory connected to external components through an optical fiber array and corresponding optical connectors or ferrules. One problem is that optical interconnect packages need less than sub-um alignment accuracy to align the optical fibers to the on-chip photonics waveguide. Arrays of the optical fibers need to be assembled simultaneously to achieve high volume assembly, which makes meeting the alignment accuracy requirement a significant challenge for yield.

DESCRIPTION OF THE EMBODIMENTS

Silicon groove architectures and manufacturing processes for passive alignment in photonics modules are described. In the following description, numerous specific details are set forth, such as specific material and tooling regimes, in order to provide a thorough understanding of embodiments of the present disclosure. It will be apparent to one skilled in the art that embodiments of the present disclosure may be practiced without these specific details. In other instances, well-known features, such as single or dual damascene processing, are not described in detail in order to not unnecessarily obscure embodiments of the present disclosure. Furthermore, it is to be understood that the various embodiments shown in the Figures are illustrative representations and are not necessarily drawn to scale. In some cases, various operations will be described as multiple discrete operations, in turn, in a manner that is most helpful in understanding the present disclosure, however, the order of description should not be construed to imply that these operations are necessarily order dependent. In particular, these operations need not be performed in the order of presentation.

Certain terminology may also be used in the following description for the purpose of reference only, and thus are not intended to be limiting. For example, terms such as "upper", "lower", "above", "below," "bottom," and "top" refer to directions in the drawings to which reference is made. Terms such as "front", "back", "rear", and "side" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import.

There is increased need for techniques to integrate fiber connectors with a flip chip package. One or more embodiments described herein are directed to silicon groove architectures and manufacturing processes for passive alignment in photonics die.

Figure 1A:
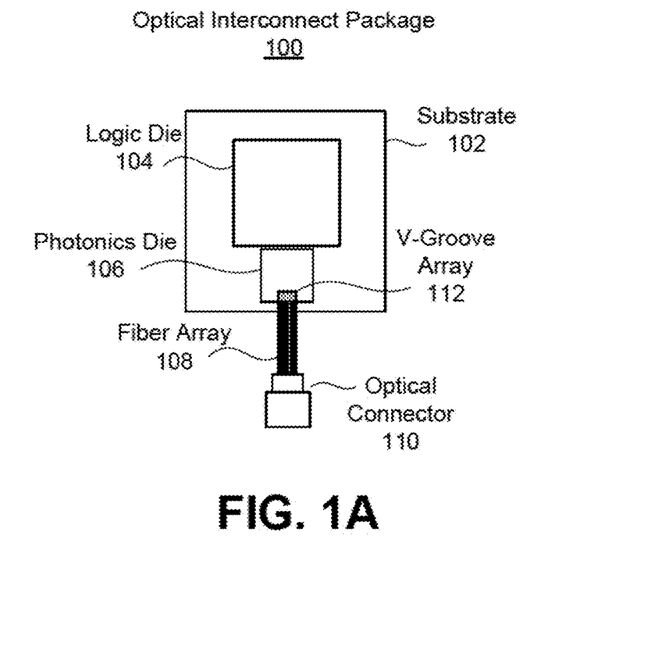
FIGS. 1A-1C illustrates an example of a silicon v-groove structure for integrating an optical interconnect or a fiber connector in an optical interconnect semiconductor package.
Figure 1B:
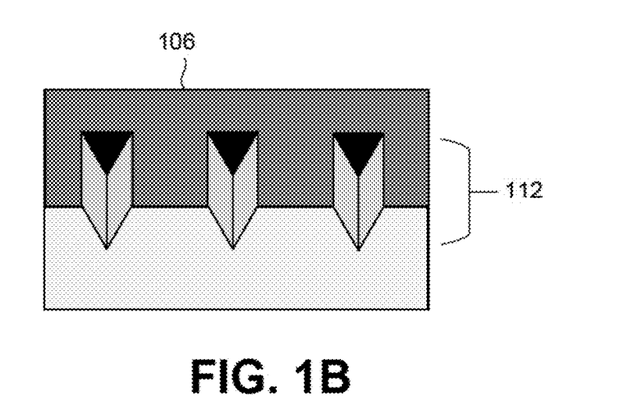
Figure 1C:
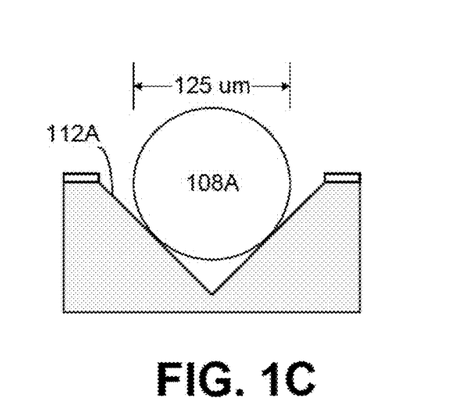

To provide context, FIGS. 1A-1C illustrates an example of a silicon groove structure for integrating an optical interconnect or a fiber connector in an optical interconnect semiconductor package. FIG. 1A illustrates a top view of the optical interconnect package 100, which includes a logic die 104 mounted to a polymer substrate 102. The optical interconnect may comprise a photonics die 106 mounted on the polymer substrate 102 and connected to the logic die 104 through the polymer substrate 102 and connected to external components through an optical fiber array 108 and a corresponding optical connector 110 also called a ferrule. The optical interconnect packages 100 need less than 1 um alignment accuracy to align the optical fibers comprising the fiber array 108 to the photonics die 106.

FIG. 1B illustrates a front, close-up view of an edge of photonics die 106 showing that existing solutions use a V-groove array 112 to guide and align the fiber array 108 into the photonics die 106. The V-groove array 112 is fabricated by wet non-isotropic etching of silicon comprising a body of the photonics die 106. FIG. 1C shows that after formation of the V-groove array 112, respective optical fibers in the fiber array 108 are inserted into corresponding V-grooves 112A. Typically, each of the optical fibers 108A is 125 um in diameter. Sidewalls of the V-grooves are etched at certain degree angle. After the optical fibers 108A are inserted, a compressor plate then presses on top of the optical fibers 108A to push the fiber down in the groove so that the center of the optical fiber 108A is aligned with the top surface of the photonics die 106.

Because the non-isotropic etching process for the V-grooves uses the <111> crystal plane of the silicon as an etch stop, non-isotropic etching cannot be used if the photonics die 106 requires multiple optical fibers 108A to be aligned in different directions. The V-grooves are also high stress points that may result in cracking of the photonics die 106 after die thinning, and use of a thicker photonics die may limit any use of through-silicon vias (TSV) in the photonics die. Finally, use of wet non-isotropic etching may impose limitations if it is performed after for the photonics die is thinned.

In accordance with the disclosed embodiments, improved groove alignment architectures and manufacturing processes for passive alignment of optical fibers in a photonics die are described. Embodiments disclose groove alignment structures. An etch stop material and a substrate is over the etch stop material. A set of grooves is along a first direction in a top surface of the substrate, and adhesive material is in a bottom of the set of grooves. Optical fibers are in the set of grooves over the adhesive material and a portion of each of the optical fibers may extend above the substrate. A set of polymer guides is along the first direction on the top surface of the substrate interleaved with the set of grooves.

Embodiments disclose novel-shaped groove alignment structures defined by 2-step lithographic etching of silicon and corresponding polymer structures to guide the optical fibers into the grooves for lithographic-based XY alignment accuracy. Such an approach enables the use of thin photonics die and die thickness control accuracy to achieve Z alignment. Use of thin photonics die also enable use of TSV through the photonics die.

Figure 2A:
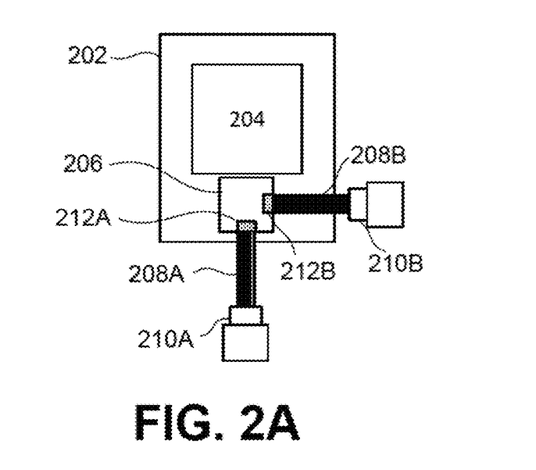
FIG. 2A illustrates a top view of the optical interconnect package.
Figure 2B:
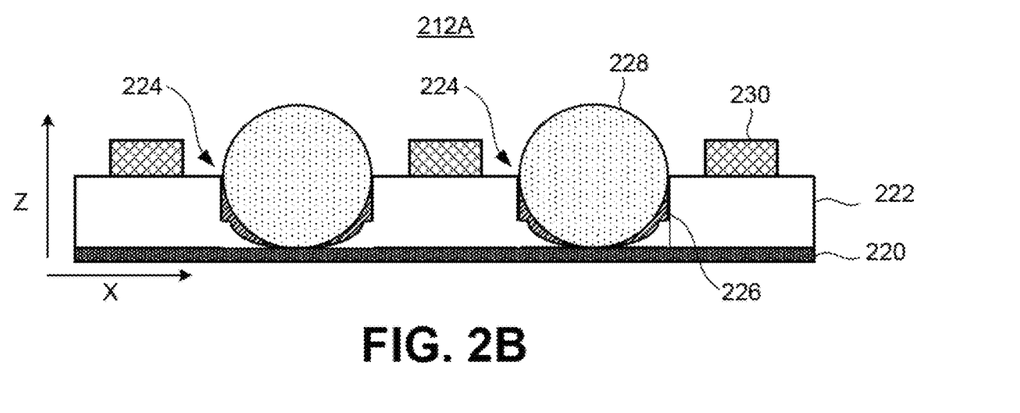
FIG. 2B illustrates a front, close-up view of an edge of photonics die showing one embodiment of a first groove alignment structure to guide and align the fiber array into the photonics die.
Figure 2C:
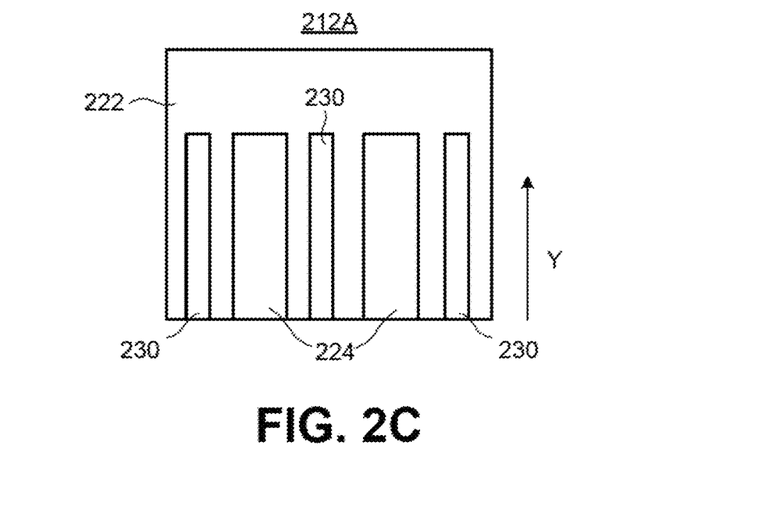
FIG. 2C is a top view of the first groove alignment structure without the optical fibers showing the set of grooves interleaved with the set of polymer guides are substantially parallel.

FIGS. 2A-2C illustrates an example of a groove alignment structure for integrating an optical interconnect or a fiber connector in an optical interconnect semiconductor package. FIG. 2A illustrates a top view of the optical interconnect package 200. The optical interconnect package 200 includes a logic die 204 mounted to a substrate 202 (e.g., a polymer substrate) and a photonics die 206 mounted on the substrate 202 to transmit and receive optical I/O. For example, in one embodiment, the photonic die 206 may provide a Terabit/s optical physical layer to support high-bandwidth, low-latency connectivity. In one embodiment, the photonics die 206 refers to a single die. In another embodiment, the photonics die 206 may be included in a photonic multi-chip-package with laser and electronic control chips. The photonics die 206 may be mounted to the substrate 102 through micro-bumps or other contacts and may be connected to the logic die 204 through interconnects within the substrate 202. In one embodiment, the photonics die 206 may have a body comprising a silicon substrate and the photonics die 206 may have a thickness of approximately 75 um.

In one embodiment, the photonic die 206 may be connected to external components (not shown) through a first optical interconnect comprising optical fiber array 208A and optical connector 210A along one side of the photonics die 206, and a second optical interconnect comprising optical fiber array 208B and optical connector 210B along another side of the photonics die 206. Optical fiber arrays 208A and 208B run in two different directions on the photonics die 206. Accordingly, a V-groove array is not suitable to guide and align both of the optical fiber arrays 208A and 208B due to limitations in non-isotropic etching of the surface of the photonics die 206. Optical fiber arrays 208A and 208B are collectively referred to herein as optical fiber array 208, and optical connectors 210A and 210B are collectively referred to herein as optical connectors 210.

According to the disclosed embodiments, the optical interconnect package 200 includes two groove alignment structures 212A and 212B on the photonics die 206 that allow for the optical fiber arrays 208A and 208B to run in different directions on the photonics die 206 and still meet the less than 1 um alignment accuracy to align the optical fibers.

FIG. 2B illustrates a front, close-up view of an edge of photonics die 206 showing one embodiment of a first groove alignment structure 212A to guide and align the optical fiber array 208A into the photonics die 206. The cross-section view shows that the first groove alignment structure 212A comprises an etch stop material 220, a substrate 222 over the etch stop material 220, and a set of grooves 224 along a first direction in a top surface of the substrate 222. The second groove alignment structure 212B comprises a second set of grooves (not shown) along a second direction in a top surface of the substrate 222.

An adhesive material 226 is in a bottom of the set of grooves 224. Optical fibers 228 comprising the optical fiber array 208A are in the set of grooves 224 over the adhesive material 226, and a portion of each of the optical fibers 228 extends or rises above the substrate 222. A set of polymer guides 230 run along a first direction on a top surface of the substrate 222 interleaved with the set of grooves 224. The set of polymer guides 230 function as passive alignment structures to help guide the optical fibers 228 into the set of grooves 224.

FIG. 2C is a top view of the first groove alignment structure 212A without the optical fibers 228 and shows that the set of grooves 224 interleaved with the set of polymer guides 230 are substantially parallel (+/−5 degrees) on the substrate 222. As shown in FIG. 2A, directions of the optical fiber arrays 208A and 208B are substantially orthogonal to one another on the photonics die 206, as are the first and second groove alignment structures 212A and 212B.

Due to the methods of fabrication, different groove alignment structures are possible. For example, referring again to FIG. 2A, the first groove alignment structure 212A has a cross-section that is U-shaped. The groove cross-section shape is determined by sidewalls of the groove, the etch stop material 220, and any silicon material remaining in the groove after etching.

Figure 3A:
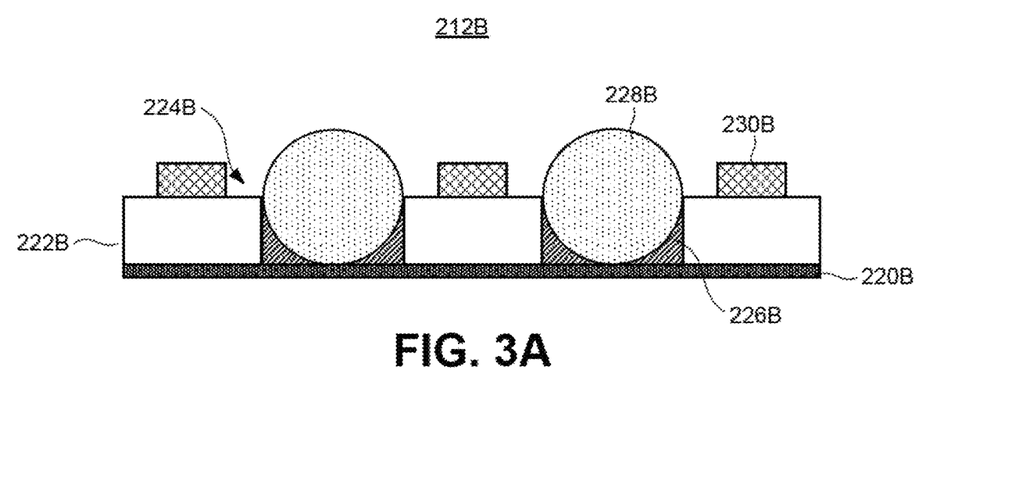
FIGS. 3A and 3B illustrate front, close-up views of an edge of photonics die showing embodiments for a second groove alignment structure and a third groove alignment structure.
Figure 3B:
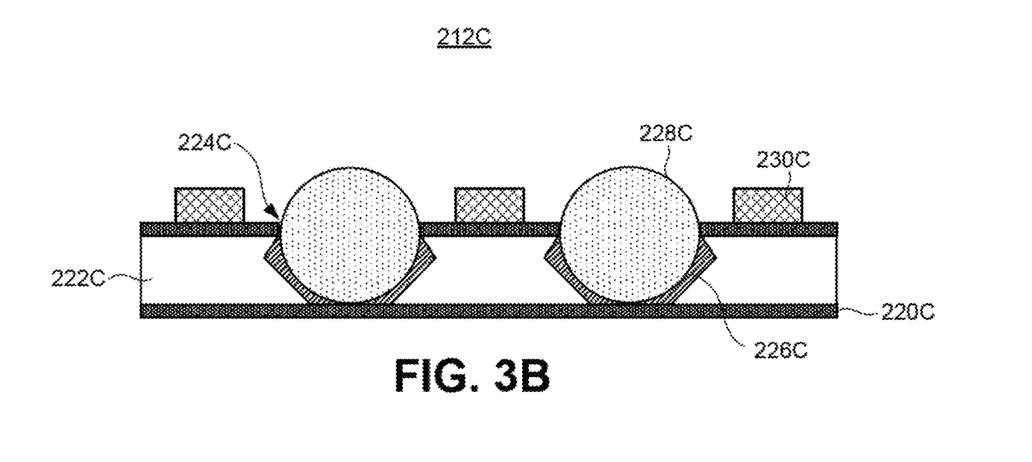

FIGS. 3A and 3B illustrate front, close-up views of an edge of photonics die showing embodiments for a second groove alignment structure 212B and a third groove alignment structure 212C, respectively. In the second embodiment shown in FIG. 3B, the second groove alignment structure 212B has a cross-section that is square-shaped. In a third embodiment shown in FIG. 3C, the third groove alignment structure 212C has a cross-section that has an under etch-shape.

In the first, second and third embodiments, the optical fibers 228 may have a diameter of approximately 80-125 um, and a pitch of approximately 125-250 um. In one embodiment, the substrate 222 may have a thickness of approximately one-half of a diameter of the optical fibers 228. The set of grooves 224 may each have a width of approximately equal to the diameter of the optical fibers 228.

The disclosed embodiments thus disclose novel-shaped groove alignment structures defined by 2-step lithographic etching of silicon and corresponding polymer guides 230 to guide the optical fibers 228 into the grooves 224 for lithographic-based XY alignment accuracy. Grooves at any silicon plain angle can be supported and the polymer guides help with crude alignment of fibers into the grooves. Such an approach enables the use of thin photonics die and die thickness control (~1 um accuracy) to achieve Z alignment. Use of thin photonics die also enable use of TSV through the photonics die due to the thinness (e.g., ~75 um). Although in one embodiment all the following process steps utilize dry etching to allow more versatility, in another embodiment, an isotropic wet etch may also be used.

Figure 4A:
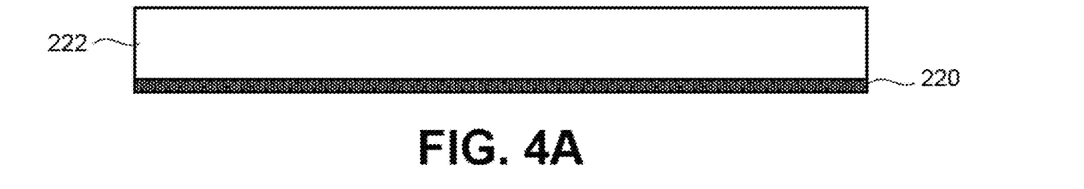
FIGS. 4A-4D are cross-section diagrams illustrating an exemplary process flow for fabricating a groove alignment structure according to the first embodiment.

FIGS. 4A-4D are cross-section diagrams illustrating an exemplary process flow for fabricating a groove alignment structure according to the first embodiment. FIG. 4A shows that the process may begin by applying an etch stop material 220 to a backside of a substrate 222 comprising the photonics die. In one embodiment, the substrate comprises silicon (Si), but may comprise other materials including, but are not limited to: silicon germanium (SiGe), silicon-on-insulator (SOI), and group III-V semiconductors.

In an embodiment, etch stop material 220 may comprise a layer of a nitride of silicon (e.g., silicon nitride) or a layer of an oxide of silicon, or both, or a combination thereof. Other suitable materials may include carbon-based materials, such as silicon carbide. Alternatively, other etch stop layers known in the art may be used depending upon the particular implementation. In certain embodiments, the thickness of the etch stop material 220 may range from approximately 1.0 to 10.0 μm. The etch stop layers may be formed by CVD, PVD, or by other deposition methods. In embodiments, the etch stop material 220 may be spun-on the surface of the substrate using standard techniques.

Figure 4B:
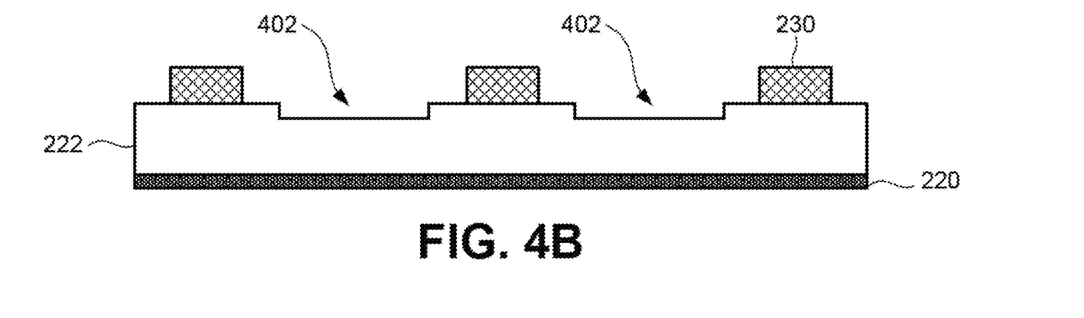

FIG. 4B shows that on an opposite or a front side of the substrate 222 a first etch process is performed to form openings 402 that define accurate locations and widths of a plurality of grooves along a first direction in the substrate 222. The first lithography and etch process defines X and Z alignment for the optical fiber array with sub-micron accuracy. Bridge thickness control defines Z alignment within 1 um. Once inserted into the grooves, the optical fibers move within a plane (Y) of the substrate 222 (see FIGS. 2A and 2B).

In embodiments, the etching process may be performed by a dry etch (e.g., a reactive-ion etch) or a laser etching process. Laser etching, if used, may also allow groove creation after the photonic die is attached to a package, which reduces the risk of the photonics die cracking. Any type of dry etching process that etches directionally or anisotropically may be used. Optionally, a wet etch may be used in place of a dry etch. The etching process is performed after an etch mask is formed using known photolithographic methods. In certain embodiments, the etch mask may be a hard mask of silicon dioxide or silicon nitride; and in other embodiments the etch-mask is a made from known photoresist materials FIG. 4B also shows that polymer guides 230 are deposited in-between the openings 402 and run in the same direction as the openings 402. As described above, the polymer guides 230 help with crude alignment of the optical fibers on the photonics die.

Figure 4C:
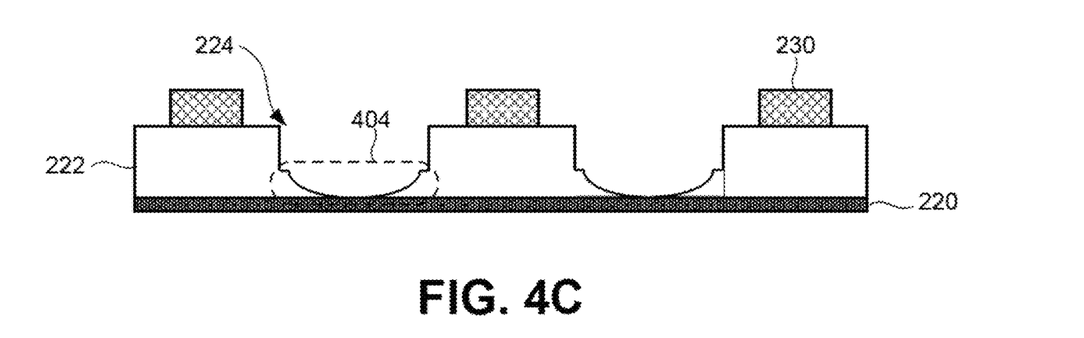

FIG. 4C shows that after the polymer guides 230 are formed, a second etch process is performed on the openings 402 to remove Si down to the etch stop material 220 to form the grooves 224. As shown, the second etch process is performed on the openings such that the sidewalls and bottom form a U-shape 404 at the bottom of the grooves 224. In embodiments, the second etching process may be performed by a dry etch (e.g., a reactive-ion etch) or a laser etching process.

Figure 4D:
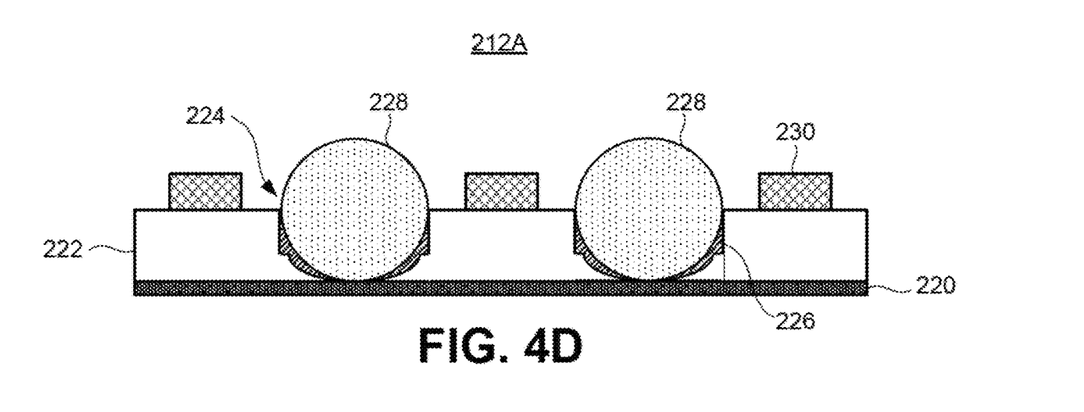

FIG. 4D shows that after the second etch process, an adhesive material 226 is inserted or dispensed into the bottom of each of the grooves 224 and an optical fiber 228 of the optical fiber array is inserted into respective ones of the grooves 224 over the adhesive material 226. Approximately one-half of each of the optical fibers 228 extends arises above a surface of the substrate 222. The resultant groove alignment structure 212A is now ready to be covered by a polymer lid (not shown).

Figure 5A:
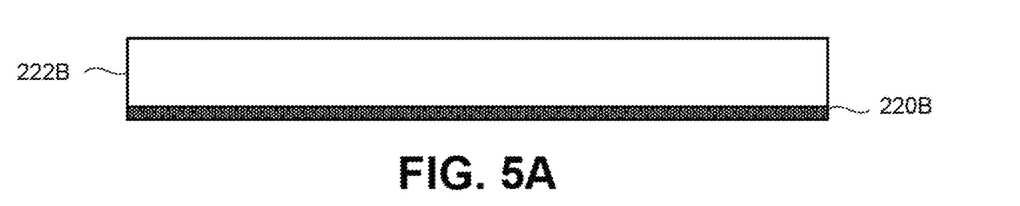
FIGS. 5A-5C are cross-section diagrams illustrating an exemplary process flow for fabricating a groove alignment structure according to the first embodiment.
Figure 5B:
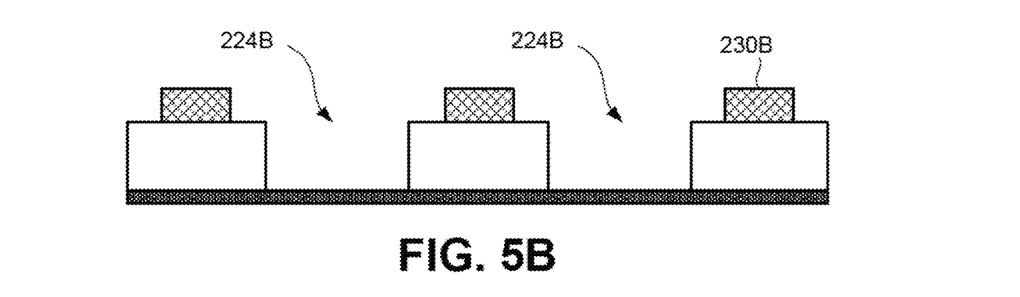
Figure 5C:
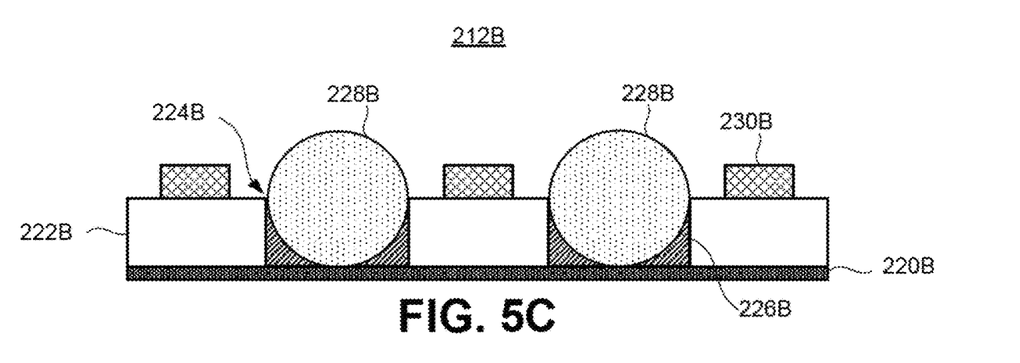

FIGS. 5A-5C are cross-section diagrams illustrating an exemplary process flow for fabricating a groove alignment structure according to the second embodiment. FIG. 5A shows that the process may begin by applying an etch stop material 220B to a backside of a substrate 222B comprising the photonics die.

FIG. 5B shows that on an opposite or a front side of the substrate 222B, an etch process is performed to remove silicon material down to the etch stop material 220B to form the grooves 224B in specific locations and with specific widths along a first direction in the substrate 222B. As shown, the etch process creates grooves 224B that are substantially square shaped as defined by near vertical sidewalls and the bottom etch stop material 220B. In embodiments, the etching process may be performed by a dry etch, such as a Bosch high-aspect ratio plasma etching process in which cyclic isotropic etching is performed.

FIG. 5B also shows that polymer guides 230B are deposited in-between the grooves 224B and run in the same direction as the openings 402. As described above, the polymer guides 230B help with crude alignment of the optical fibers on the photonics die.

FIG. 5C shows that after the etch process, an adhesive material 226B is inserted into the bottom of each of the grooves 224B and an optical fiber 228B is inserted into each of the grooves 224B over the adhesive material 226B. Approximately one-half of each of the optical fibers 228B extends above a surface of the substrate 222B. The resultant groove alignment structure 212B is now ready to be covered by a polymer lid (not shown).

Figure 6A:
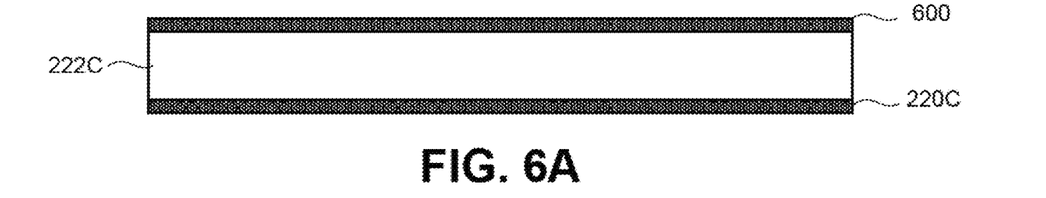
FIGS. 6A-6D are cross-section diagrams illustrating an exemplary process flow for fabricating a groove alignment structure according to the third embodiment in which a combination of isotropic and anisotropic etch are used.

FIGS. 6A-6D are cross-section diagrams illustrating an exemplary process flow for fabricating a groove alignment structure according to the third embodiment in which a combination of isotropic and anisotropic etch are used. FIG. 6A shows that the process may begin by applying an etch mask 600 to a front side of the substrate 222C and applying an etch stop material 220C to a backside of a substrate 222C comprising the photonics die. The etch mask 600 is formed using known photolithographic methods. In certain embodiments, the etch mask 600 may be a hard mask of silicon dioxide or silicon nitride; and in other embodiments the etch-mask is a made from known photoresist materials. Openings in the etch mask 600 define the locations of a plurality of grooves to be formed along a first direction in the substrate 222C, and widths of the openings will define eventual widths of the plurality of grooves after the etching processes.

In one embodiment, the substrate comprises silicon (Si), but may comprise other materials including, but are not limited to: silicon germanium (SiGe), silicon-on-insulator (SOI), and group III-V semiconductors. In an embodiment, etch stop material 220C may comprise a layer of a nitride of silicon (e.g., silicon nitride) or a layer of an oxide of silicon, or both, or a combination thereof. Other suitable materials may include carbon-based materials, such as silicon carbide. Alternatively, other etch stop layers known in the art may be used depending upon the particular implementation. In certain embodiments, the thickness of the etch stop material 220C may range from approximately 1.0 to 10.0 μm. The etch stop layers may be formed by CVD, PVD, or by other deposition methods. In embodiments, the etch stop material 220C may be spun-on the surface of the substrate using standard techniques.

Figure 6B:
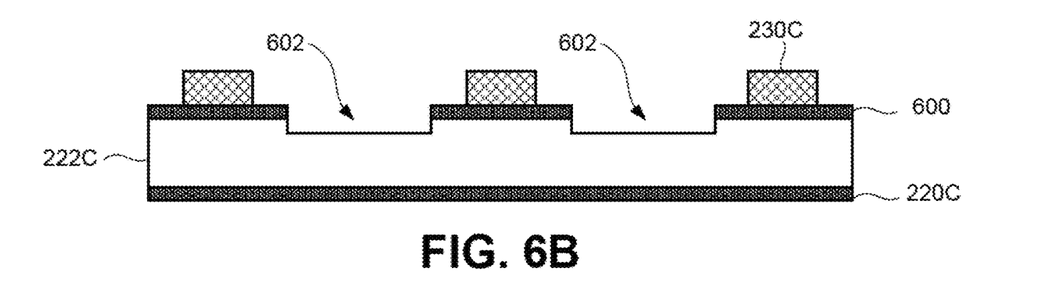

FIG. 6B shows that a first lithography etch process is performed to form openings 602 to define accurate locations and widths of the plurality of grooves 224C. The first lithography and etch process defines X and Z alignment for the optical fibers 228C with sub-micron accuracy. Bridge thickness control defines Z alignment within 1 um. In embodiments, an isotropic etching process may be performed by a dry etch (e.g., a reactive-ion etch) or a laser etching process. Laser etching, if use may also allow groove creation after the photonic die is attached to a package, which reduces the risk of the photonics die cracking. Any type of dry etching process that etches directionally or anisotropically may be used. Optionally, a wet etch may be used in place of a dry etch.

FIG. 6B also shows that polymer guides 230C are deposited over the etch mask 600 in-between the openings 602 and run in the same direction as the openings 402. As described above, the polymer guides 230C help with crude alignment of the optical fibers on the photonics die.

Figure 6C:
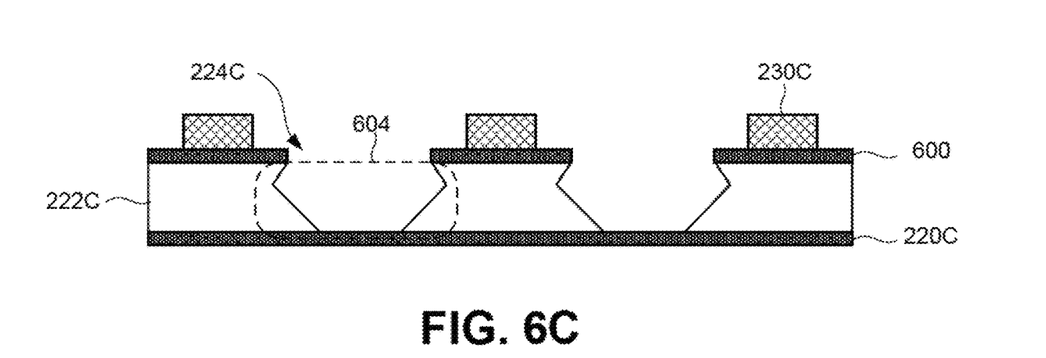

FIG. 6C shows that after the polymer guides 230C are formed, a second etch process is performed on the openings 602 to remove the silicon substrate material down to the etch stop material 220C to form the grooves 224C. In embodiments, the second etching process comprises a wet isotropic etch. As shown, the second etch process etches sidewalls of the grooves 224C beneath the etch mask 600 such that the sidewalls form an under etch-shape 604, where the widest part of the grooves 224C is wider than the corresponding opening 602 in the substrate 222C.

Figure 6D:
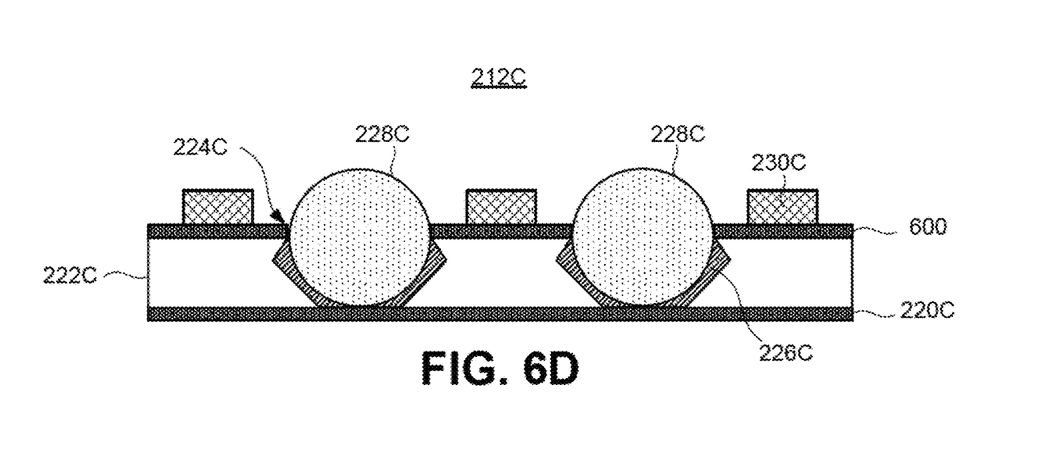

FIG. 6D shows that after the second etch process, an adhesive material 226C is inserted or dispensed into the bottom of each of the grooves 224C and an optical fiber 228C is inserted into each of the grooves 224C over the adhesive material 226C such that approximately one-half of each of the optical fibers 228C extends above a surface of the substrate 222C. The resultant groove alignment structure 212A is now ready to be covered by a polymer lid (not shown).

The third embodiment utilizes a combination of a dry etch and a wet etch to form a groove alignment structure having under etch-shaped grooves. The wider openings of the grooves 224C ensures that the optical fibers 228C can be inserted into the grooves 224C without any potential interferences from sidewall surface non-uniformities. In addition, the wider openings of the grooves 224C can accommodate excess adhesive 226C as well.

Figure 7:
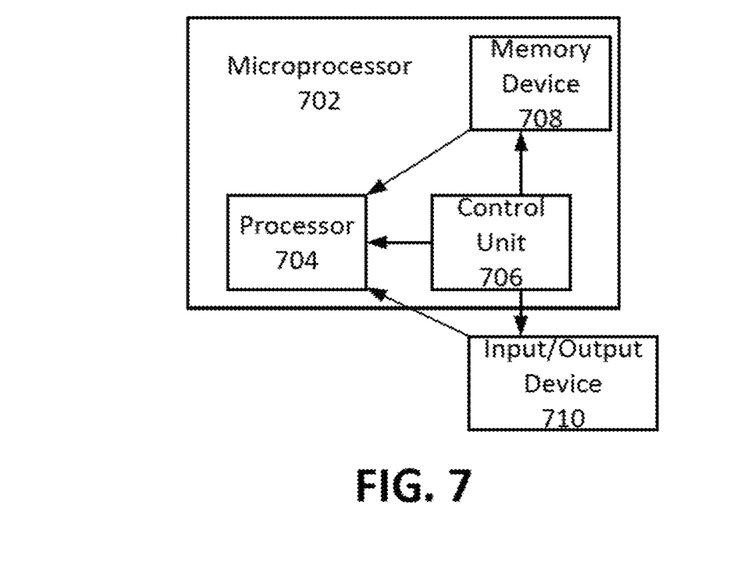
FIG. 7 illustrates a block diagram of an electronic system, in accordance with an embodiment of the present disclosure.

FIG. 7 illustrates a block diagram of an electronic system 700, in accordance with an embodiment of the present disclosure. The electronic system 700 can correspond to, for example, a portable system, a computer system, a process control system, or any other system that utilizes a processor and an associated memory. The electronic system 700 may include a microprocessor 702 (having a processor 704 and control unit 706), a memory device 708, and an input/output device 710 (it is to be appreciated that the electronic system 700 may have a plurality of processors, control units, memory device units and/or input/output devices in various embodiments). In one embodiment, the electronic system 700 has a set of instructions that define operations which are to be performed on data by the processor 704, as well as, other transactions between the processor 704, the memory device 708, and the input/output device 710. The control unit 706 coordinates the operations of the processor 704, the memory device 708 and the input/output device 710 by cycling through a set of operations that cause instructions to be retrieved from the memory device 708 and executed. The memory device 708 can include a non-volatile memory cell as described in the present description. In an embodiment, the memory device 708 is embedded in the microprocessor 702, as depicted in FIG. 7. In an embodiment, the processor 704, or another component of electronic system 700, includes one or more groove alignment structures, such as those described herein.

Figure 8:
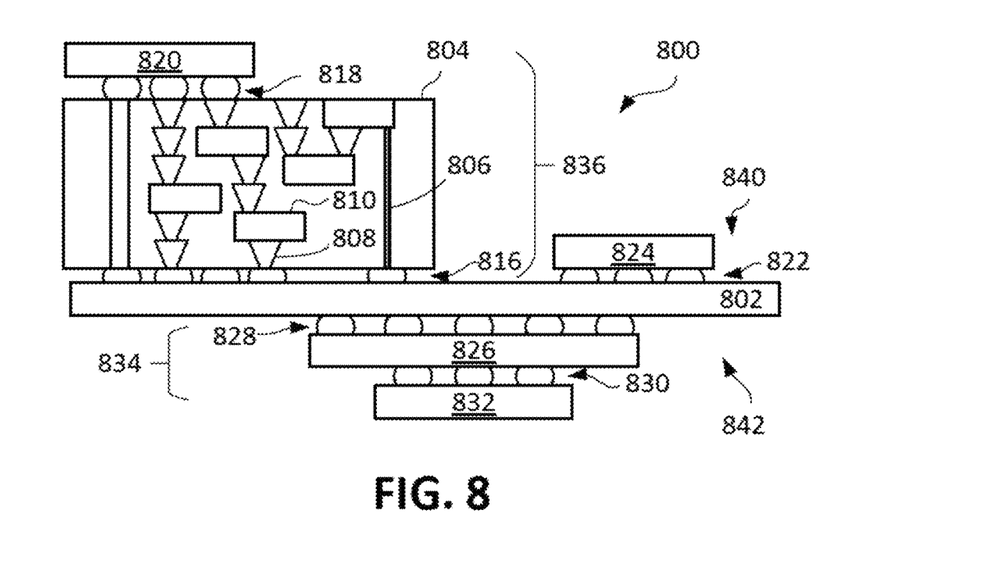
FIG. 8 is a cross-sectional side view of an integrated circuit (IC) device assembly that may include one or more groove alignment structures, in accordance with one or more of the embodiments disclosed herein.

FIG. 8 is a cross-sectional side view of an integrated circuit (IC) device assembly that may include one or more groove alignment structures, in accordance with one or more of the embodiments disclosed herein.

Referring to FIG. 8, an IC device assembly 800 includes components having one or more integrated circuit structures described herein. The IC device assembly 800 includes a number of components disposed on a circuit board 802 (which may be, e.g., a motherboard). The IC device assembly 800 includes components disposed on a first face 840 of the circuit board 802 and an opposing second face 842 of the circuit board 802. Generally, components may be disposed on one or both faces 840 and 842. In particular, any suitable ones of the components of the IC device assembly 800 may include a number of groove alignment structures, such as disclosed herein.

In some embodiments, the circuit board 802 may be a printed circuit board (PCB) including multiple metal layers separated from one another by layers of dielectric material and interconnected by electrically conductive vias. Any one or more of the metal layers may be formed in a desired circuit pattern to route electrical signals (optionally in conjunction with other metal layers) between the components coupled to the circuit board 802. In other embodiments, the circuit board 802 may be a non-PCB substrate.

The IC device assembly 800 illustrated in FIG. 8 includes a package-on-interposer structure 836 coupled to the first face 840 of the circuit board 802 by coupling components 816. The coupling components 816 may electrically and mechanically couple the package-on-interposer structure 836 to the circuit board 802, and may include solder balls (as shown in FIG. 8), male and female portions of a socket, an adhesive, an underfill material, and/or any other suitable electrical and/or mechanical coupling structure.

The package-on-interposer structure 836 may include an IC package 820 coupled to an interposer 804 by coupling components 818. The coupling components 818 may take any suitable form for the application, such as the forms discussed above with reference to the coupling components 816. Although a single IC package 820 is shown in FIG. 8, multiple IC packages may be coupled to the interposer 804. It is to be appreciated that additional interposers may be coupled to the interposer 804. The interposer 804 may provide an intervening substrate used to bridge the circuit board 802 and the IC package 820. The IC package 820 may be or include, for example, a die, or any other suitable component. Generally, the interposer 804 may spread a connection to a wider pitch or reroute a connection to a different connection. For example, the interposer 804 may couple the IC package 820 (e.g., a die) to a ball grid array (BGA) of the coupling components 816 for coupling to the circuit board 802. In the embodiment illustrated in FIG. 8, the IC package 820 and the circuit board 802 are attached to opposing sides of the interposer 804. In other embodiments, the IC package 820 and the circuit board 802 may be attached to a same side of the interposer 804. In some embodiments, three or more components may be interconnected by way of the interposer 804.

The interposer 804 may be formed of an epoxy resin, a fiberglass-reinforced epoxy resin, a ceramic material, or a polymer material such as polyimide. In some implementations, the interposer 804 may be formed of alternate rigid or flexible materials that may include the same materials described above for use in a semiconductor substrate, such as silicon, germanium, and other group III-V and group IV materials. The interposer 804 may include metal interconnects 810 and vias 808, including but not limited to through-silicon vias (TSVs) 806. The interposer 804 may further include embedded devices, including both passive and active devices. Such devices may include, but are not limited to, capacitors, decoupling capacitors, resistors, inductors, fuses, diodes, transformers, sensors, electrostatic discharge (ESD) devices, and memory devices. More complex devices such as radio-frequency (RF) devices, power amplifiers, power management devices, antennas, arrays, sensors, and microelectromechanical systems (MEMS) devices may also be formed on the interposer 804. The package-on-interposer structure 836 may take the form of any of the package-on-interposer structures known in the art.

The IC device assembly 800 may include an IC package 824 coupled to the first face 840 of the circuit board 802 by coupling components 822. The coupling components 822 may take the form of any of the embodiments discussed above with reference to the coupling components 816, and the IC package 824 may take the form of any of the embodiments discussed above with reference to the IC package 820.

The IC device assembly 800 illustrated in FIG. 8 includes a package-on-package structure 834 coupled to the second face 842 of the circuit board 802 by coupling components 828. The package-on-package structure 834 may include an IC package 826 and an IC package 832 coupled together by coupling components 830 such that the IC package 826 is disposed between the circuit board 802 and the IC package 832. The coupling components 828 and 830 may take the form of any of the embodiments of the coupling components 816 discussed above, and the IC packages 826 and 832 may take the form of any of the embodiments of the IC package 820 discussed above. The package-on-package structure 834 may be configured in accordance with any of the package-on-package structures known in the art.

Figure 9:
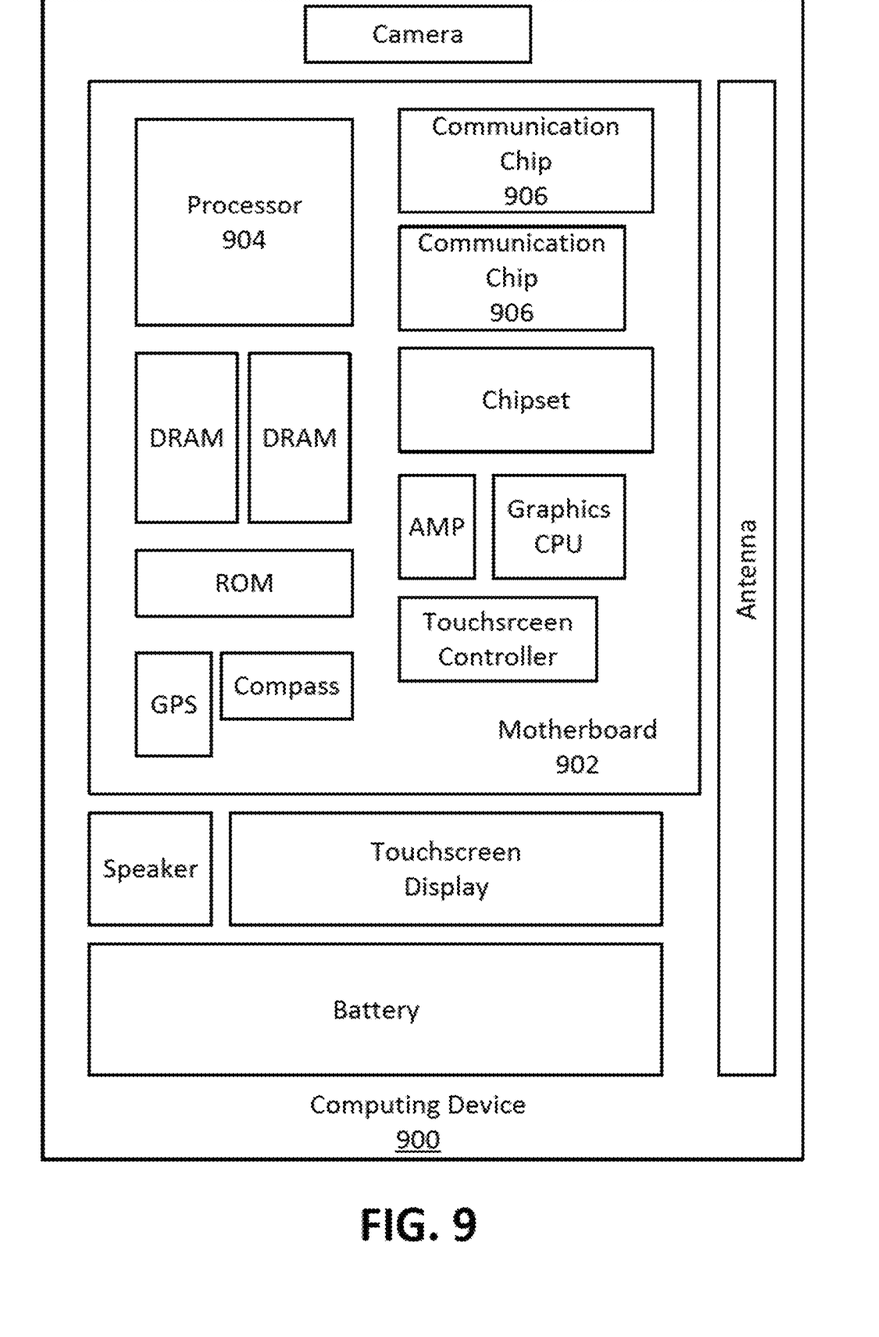
FIG. 9 illustrates a computing device in accordance with one implementation of the disclosure.

FIG. 9 illustrates a computing device 900 in accordance with one implementation of the disclosure. The computing device 900 houses a board 902. The board 902 may include a number of components, including but not limited to a processor 904 and at least one communication chip 906. The processor 904 is physically and electrically coupled to the board 902. In some implementations the at least one communication chip 906 is also physically and electrically coupled to the board 902. In further implementations, the communication chip 906 is part of the processor 904.

Depending on its applications, computing device 900 may include other components that may or may not be physically and electrically coupled to the board 902. These other components include, but are not limited to, volatile memory (e.g., DRAM), non-volatile memory (e.g., ROM), flash memory, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, an accelerometer, a gyroscope, a speaker, a camera, and a mass storage device (such as hard disk drive, compact disk (CD), digital versatile disk (DVD), and so forth).

The communication chip 906 enables wireless communications for the transfer of data to and from the computing device 900. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 906 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 900 may include a plurality of communication chips 906. For instance, a first communication chip 906 may be dedicated to shorter range wireless communications such as Wi-Fi and Bluetooth and a second communication chip 906 may be dedicated to longer range wireless communications such as GPS, EDGE, GPRS, CDMA, WiMAX, LTE, Ev-DO, and others.

The processor 904 of the computing device 900 includes an integrated circuit die packaged within the processor 904. In some implementations of the disclosure, the integrated circuit die of the processor includes one or more groove alignment structures, in accordance with implementations of embodiments of the disclosure. The term "processor" may refer to any device or portion of a device that processes electronic data from registers and/or memory to transform that electronic data into other electronic data that may be stored in registers and/or memory.

The communication chip 906 also includes an integrated circuit die packaged within the communication chip 906. In accordance with another implementation of embodiments of the disclosure, the integrated circuit die of the communication chip includes one or more groove alignment structures, in accordance with implementations of embodiments of the disclosure.

In further implementations, another component housed within the computing device 900 may contain an integrated circuit die that includes one or more groove alignment structures, in accordance with implementations of embodiments of the disclosure.

In various implementations, the computing device 900 may be a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computing device 900 may be any other electronic device that processes data.

Silicon groove architectures and manufacturing processes have been described for passive alignment in a photonics die.

The above description of illustrated implementations of embodiments of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize.

These modifications may be made to the disclosure in light of the above detailed description. The terms used in the following claims should not be construed to limit the disclosure to the specific implementations disclosed in the specification and the claims. Rather, the scope of the disclosure is to be determined entirely by the following claims, which are to be construed in accordance with established doctrines of claim interpretation.

Example embodiment 1: A groove alignment structure comprises an etch stop material and a substrate over the etch stop material. A set of grooves is along a first direction in a top surface of the substrate, and adhesive material is in a bottom of the set of grooves. Optical fibers are in the set of grooves over the adhesive material and a portion of the optical fibers extends above the substrate. A set of polymer guides is along the first direction on the top surface of the substrate interleaved with the set of grooves.

Example embodiment 2: The groove alignment structure of embodiment 1, wherein the set of grooves have a cross-section that is U-shaped.

Example embodiment 3: The groove alignment structure of embodiment 1, the set of grooves have a cross-section that is square-shaped.

Example embodiment 4: The groove alignment structure of embodiment 1, wherein the set of grooves have a cross-section that has an under etch-shape.

Example embodiment 5: The groove alignment structure of embodiment 1, 2, 3, or 4, wherein the groove alignment structure comprises a first groove alignment structure on a photonics die, and the set of grooves comprise a first set of grooves along the first direction, wherein the photonics die includes a second groove alignment structure with a second set of grooves along a second direction generally orthogonal to the first direction.

Example embodiment 6: The groove alignment structure of package module of embodiment 1, 2, 3, 4, or 5, wherein the optical fibers have a diameter of approximately 80-125 um and pitch of approximately 125-250 um.

Example embodiment 7: The groove alignment structure of embodiment 1, 2, 3, 4, 5, or 6, wherein the substrate has a thickness of approximately 75 um.

Example embodiment 8: The groove alignment structure of embodiment 1, 2, 3, 4, 5, 6, or 7, wherein the substrate has a thickness of approximately one-half of a diameter of the optical fibers.

Example embodiment 9: The groove alignment structure of embodiment 1, 2, 3, 4, 5, 6, 7, or 8, wherein the set of grooves each have a width approximately equal to a diameter of the optical fibers.

Example embodiment 10: The groove alignment structure of embodiment 1, 2, 3, 4, 5, 6, 7, 8, or 9, wherein set of polymer guides each have a thickness of approximately 20-70 um.

Example embodiment 11: A method for fabricating a groove alignment structure comprises applying an etch stop material to a backside of a silicon substrate comprising a photonics die. A first etch process is performed to form openings that define locations and widths of a plurality of grooves along a first direction in the silicon substrate. Polymer guides are formed in-between the openings, the polymer guides running a same direction as the openings. A second etch process is performed on the openings to remove silicon down to the etch stop material to form grooves. An adhesive material is deposited into a bottom of the grooves. An optical fiber of an optical fiber array is inserted into respective ones of grooves.

Example embodiment 12: The method of embodiment 11, further comprising performing the second etch process such that the sidewalls and a bottom form a U-shape at the bottom of the grooves.

Example embodiment 13: The method of embodiment 11 or 12, further comprising performing the first etch process and the second etch process as dry etches or laser etches.

Example embodiment 14: The method of embodiment 11, 12, or 13, further comprising performing the first etch process and the second etch process as dry etches or laser etches.

Example embodiment 15: The method of embodiment 11, 12, 13, or 14, further comprising inserting the optical fiber of the optical fiber array into the respective ones of grooves such that approximately one-half of each of the optical fibers extend above the surface of the substrate.

Example embodiment 16: The method of embodiment 11, 12, 13, 14 or 15, further comprising performing the second etch process such that the sidewalls and a bottom form a etch undercut-shape at the bottom of the grooves.

Example embodiment 17: The method of embodiment 11, 12, 13, 14, 15 or 16, further comprising performing the first etch process such that X and Z alignment for the optical fiber array is defined with sub-micron accuracy.

Example embodiment 18: A method for fabricating a groove alignment structure comprises applying an etch stop material to a backside of a silicon substrate comprising a photonics die. An etch process is performed to remove silicon material down to the etch stop material to form grooves in specific locations and with specific widths along a first direction in the silicon substrate. Polymer guides are deposited in-between the grooves, the polymer guides running a same direction as the openings. An adhesive material is deposited into a bottom of the grooves. An optical fiber of an optical fiber array is inserted into respective ones of grooves.

Example embodiment 19: The method of embodiment 18, further comprising performing the etch process to create the grooves to have a substantially square-shape.

Example embodiment 20: The method of embodiment 18 or 19, further comprising performing the etch process with a dry etch.

Example embodiment 21: The method of embodiment 20, further comprising performing the etch process with a Bosch high-aspect ratio plasma etching process.

Example embodiment 22: A method for fabricating a groove alignment structure comprises applying an etch mask to a front side of the silicon substrate and applying an etch stop material to a backside of the silicon substrate comprising a photonics die. A first etch process is performed to form openings that define locations and widths of a plurality of grooves along a first direction in the silicon substrate. Polymer guides are deposited in-between the openings, the polymer guides running a same direction as the openings. A second etch process is performed on the openings to remove silicon down to the etch stop material to form grooves. An adhesive material is deposited into a bottom of the grooves. An optical fiber of an optical fiber array is inserted into respective ones of grooves.

Example embodiment 23: The method of embodiment 22, further comprising performing the second etch process such that the sidewalls and a bottom form an under etch-shape at the bottom of the grooves.

Example embodiment 24: The method of embodiment 22 or 2323, further comprising performing the first etch process such that a widest part of the grooves is wider than a corresponding opening in the silicon substrate.

Example embodiment 25: The method of embodiment 22, 23 or 24, further comprising performing the first etch process as a dry etch, and performing the second etch process as a wet etch.

What is claimed is:

1. A groove alignment structure, comprising:
   an etch stop material;
   a substrate over the etch stop material;
   a set of grooves along a first direction in a top surface of the substrate;
   adhesive material in a bottom of the set of grooves;
   optical fibers in the set of grooves over the adhesive material and a portion of the optical fibers extending above the substrate; and
   a set of polymer guides along the first direction on the top surface of the substrate interleaved with the set of grooves.

2. The groove alignment structure of claim 1, wherein the set of grooves have a cross-section that is U-shaped.

3. The groove alignment structure of claim 1, the set of grooves have a cross-section that is square-shaped.

4. The groove alignment structure of claim 1, wherein the set of grooves have a cross-section that has an under etch-shape.

5. The groove alignment structure of claim 1, wherein the groove alignment structure comprises a first groove alignment structure on a photonics die, and the set of grooves comprise a first set of grooves along the first direction, wherein the photonics die includes a second groove alignment structure with a second set of grooves along a second direction generally orthogonal to the first direction.

6. The groove alignment structure of claim 1, wherein the optical fibers have a diameter of approximately 80-125 um and pitch of approximately 125-250 um.

7. The groove alignment structure of claim 1, wherein the substrate has a thickness of approximately 75 um.

8. The groove alignment structure of claim 1, wherein the substrate has a thickness of approximately one-half of a diameter of the optical fibers.

9. The groove alignment structure of claim 1, wherein the set of grooves each have a width of approximately equal to a diameter of the optical fibers.

10. The groove alignment structure of claim 1, wherein set of polymer guides each have a thickness of approximately 20-70 um.

11. A method for fabricating a groove alignment structure, comprising:
    applying an etch stop material to a backside of a silicon substrate comprising a photonics die;
    performing a first etch process to form openings that define locations and widths of a plurality of grooves along a first direction in the silicon substrate;
    depositing polymer guides in-between the openings, the polymer guides running a same direction as the openings;
    performing a second etch process on the openings to remove silicon down to the etch stop material to form grooves;
    depositing an adhesive material into a bottom of the grooves; and
    inserting an optical fiber of an optical fiber array into respective ones of grooves.

12. The method of claim 11, further comprising performing the second etch process such that sidewalls and a bottom of the grooves form a U-shape.

13. The method of claim 12, further comprising performing the first etch process and the second etch process as dry etches or laser etches.

14. The method of claim 12, further comprising performing the first etch process and the second etch process as dry etches or laser etches.

15. The method of claim 11, further comprising inserting the optical fiber of the optical fiber array into the respective ones of grooves such that approximately one-half of each of the optical fibers extend above a surface of the silicon substrate.

16. The method of claim 11, further comprising performing the second etch process such that sidewalls and a bottom form a etch undercut-shape at the bottom of the grooves.

17. The method of claim 11, further comprising performing the first etch process such that X and Z alignment for the optical fiber array is defined with sub-micron accuracy.

18. A method for fabricating a groove alignment structure, comprising:
    applying an etch stop material to a backside of a silicon substrate comprising a photonics die;
    performing an etch process to remove silicon material down to the etch stop material to form grooves in specific locations and with specific widths along a first direction in the silicon substrate;
    depositing polymer guides in-between the grooves, the polymer guides running a same direction as the grooves;
    depositing an adhesive material into a bottom of the grooves; and
    inserting an optical fiber of an optical fiber array into respective ones of grooves.

19. The method of claim 18, further comprising performing the etch process to create the grooves to have a substantially square-shape.

20. The method of claim 19, further comprising performing the etch process with a dry etch.

21. The method of claim 19, further comprising performing the etch process with a Bosch high-aspect ratio plasma etching process.

22. A method for fabricating a groove alignment structure, comprising:
    applying an etch mask to a front side of a silicon substrate and applying an etch stop material to a backside of the silicon substrate comprising a photonics die;
    performing a first etch process to form openings that define locations and widths of a plurality of grooves along a first direction in the silicon substrate;
    depositing polymer guides in-between the openings, the polymer guides running a same direction as the openings;
    performing a second etch process on the openings to remove silicon down to the etch stop material to form grooves;

depositing an adhesive material into a bottom of the grooves; and inserting an optical fiber of an optical fiber array into respective ones of grooves.

23. The method of claim 22, further comprising performing the second etch process such that sidewalls and a bottom of the grooves form an under etch-shape.

24. The method of claim 23, further comprising performing the first etch process such that a widest part of the grooves is wider than a corresponding opening in the silicon substrate.

25. The method of claim 21, further comprising performing the first etch process as a dry etch, and performing the second etch process as a wet etch.

* * * * *